(12) United States Patent
Ko

(10) Patent No.: US 8,400,877 B2
(45) Date of Patent: Mar. 19, 2013

(54) METHOD AND APPARATUS FOR MEASURING POSITION OF THE OBJECT USING MICROPHONE

(75) Inventor: Do Young Ko, Seoul (KR)

(73) Assignee: PNF Co., Ltd. (KR)

( * ) Notice: Subject to any disclaimer, the term of this patent is extended or adjusted under 35 U.S.C. 154(b) by 385 days.

(21) Appl. No.: 12/811,246

(22) PCT Filed: Jun. 18, 2008

(86) PCT No.: PCT/KR2008/003446
§ 371 (c)(1),
(2), (4) Date: Jun. 30, 2010

(87) PCT Pub. No.: WO2009/091104
PCT Pub. Date: Jul. 23, 2009

(65) Prior Publication Data
US 2010/0281984 A1    Nov. 11, 2010

(30) Foreign Application Priority Data
Jan. 15, 2008  (KR) .......................... 10-2008-0004515

(51) Int. Cl.
*G06F 3/03* (2006.01)
(52) U.S. Cl. ........................................................ 367/127
(58) Field of Classification Search .................. 367/127, 367/128
See application file for complete search history.

(56) References Cited

U.S. PATENT DOCUMENTS

| | | | |
|---|---|---|---|
| 4,814,552 A * | 3/1989 | Stefik et al. ................... | 367/907 |
| 5,867,146 A | 2/1999 | Kim et al. | |
| 7,158,126 B2 | 1/2007 | Trajkovic et al. | |
| 2005/0150697 A1 | 7/2005 | Altman et al. | |
| 2008/0084789 A1 | 4/2008 | Altman | |
| 2010/0281984 A1 * | 11/2010 | Ko ................................ | 367/127 |

FOREIGN PATENT DOCUMENTS

| | | |
|---|---|---|
| JP | 2004-280412 | 10/2004 |
| JP | 2004-287949 | 10/2004 |
| KR | 1997-0060988 | 8/1997 |
| KR | 10-2004-0097309 | 11/2004 |
| KR | 10-2004-0101494 | 12/2004 |
| KR | 10-2007-0038456 | 4/2007 |
| WO | WO 2008018757 A1 * | 2/2008 |
| WO | WO 2008048036 A1 * | 4/2008 |
| WO | WO 2008097024 A1 * | 8/2008 |
| WO | WO 2009031758 A1 * | 3/2009 |
| WO | WO 2009091104 A1 * | 7/2009 |

OTHER PUBLICATIONS

International Search Report—PCT/KR2008/003446 dated Dec. 15, 2008.

* cited by examiner

*Primary Examiner* — Daniel Pihulic
(74) *Attorney, Agent, or Firm* — Cantor Colburn LLP

(57) ABSTRACT

Provided is a method and device for measuring a position of an ultrasonic generating device for generating ultrasonic signals and inputting information by using position measurement values of the ultrasonic generating device. Accordingly, a plurality of broadband microphones that can be used as general microphones provided to an electronic device are used in a case where information is input by using an ultrasonic generating device. In this case, a position of the ultrasonic generating device is measured by extracting an ultrasonic signal generated by the ultrasonic generating device from signals received by the broadband microphones, and information is input by using the position of the ultrasonic generating device and a trajectory of the moving ultrasonic generating device.

9 Claims, 3 Drawing Sheets

METHOD AND APPARATUS FOR MEASURING POSITION OF THE OBJECT USING MICROPHONE

TECHNICAL FIELD

The present invention relates to a position measurement device and method, and more particularly, to a method and device for measuring a position of an ultrasonic generating device for generating ultrasonic signals, and inputting information by using position measurement values of the ultrasonic generating device.

BACKGROUND ART

As electronic devices such as computers and personal digital assistants (PDAs) have been widely used, users generally record important memos or addresses or the like of friends on the electronic devices instead of pocketbooks.

Particularly, as electronic devices such as tablet personal computers (PCs) and PDAs have been popularized, the users input and record their notes on the electronic devices such as the tablet PCs and the PDAs using pens instead of keyboards. In addition, the users can make simple drawings in addition to notes using application programs such as Paintbrush.

As a method of inputting notes without using a touchscreen or a tablet PC, there is a method of implementing an ultrasonic generating device which generates a reference signal and an ultrasonic signal and is implemented in an input pen for inputting messages, measuring an absolute position of the input pen by using a time difference between the reference signal implemented as an infrared signal or a radio frequency (RF) signal and the ultrasonic signal, and inputting letters or the like by using a trajectory of the input pen moved by a user.

However, a position measurement device as described above in a related art requires ultrasonic sensors that are mounted to the electronic devices such as notebooks and PDAs to receive ultrasonic waves. As a method of mounting the ultrasonic sensors, there are a method of attaching a plurality of ultrasonic sensors to predetermined positions on an outer surface of an electronic device to perform position measurement and removing the attached ultrasonic sensors when the position measurement is terminated, and a method of including the ultrasonic sensors in the electronic device during a manufacturing process of the electronic device.

However, in the former case, there is a problem in that the ultrasonic sensors or frames to which the ultrasonic sensors are mounted have to be prepared. In the latter case, there is a problem in that including a plurality of the ultrasonic sensors for position measurement inputting in the electronic device that may have a small size is difficult.

DISCLOSURE OF INVENTION

Technical Problem

The present invention provides a method and device for measuring a position of an ultrasonic generating device by using microphones included in an electronic device and inputting information without using additional ultrasonic sensors.

Technical Solution

According to an aspect of the present invention, there is provided a position measurement device including: a plurality of microphones which are disposed at pre-determined intervals and mounted to an electronic device to receive signals having broadband frequencies; an ultrasonic signal filtering unit outputting signals only in a frequency range of an ultrasonic signal generated by an ultrasonic generating device from the broadband frequency signals received by the plurality of the microphones; and a position measurer measuring a position of the ultrasonic generating device by using differences between a reference time at which the ultrasonic generating device generates the ultrasonic signal and times at which the ultrasonic signal is received by the plurality of the microphones.

In the above aspect of the present invention, the position measurement device further comprises an audible signal filtering unit outputting audible signals only in an audible frequency band from the broadband frequency signals received by the plurality of the microphones; and an audio signal processing unit generating an audio signal to be used by the electronic device by processing the audible signal.

In the above aspect of the present invention, the position measurement device further comprises a reference signal receiver receiving the reference signal implemented as an infrared or RF (radio frequency) signal generated by the ultrasonic generating device, wherein the reference time is a time at which the reference signal receiver receives the reference signal.

According to another aspect of the present invention, there is provided a position measurement method including steps of: (a) outputting signals received by a plurality of microphones which are disposed at predetermined intervals and mounted to an electronic device to receive signals having broadband frequencies; (b) extracting signals only in a frequency band of an ultrasonic signal generated by an ultrasonic generating device from the broadband frequency signals received by the plurality of the microphones; and (c) measuring a position of the ultrasonic generating device by using differences between a reference time at which the ultrasonic generating device generates the ultrasonic signal and times at which the ultrasonic signal is received by the plurality of the microphones.

In the above aspect of the present invention, wherein in the step (b), audible signals in an audible frequency band are further extracted from the broadband frequency signals received by the plurality of the microphones, and wherein in the step (c), while the position of the ultrasonic generating device is measured, an audio signal that can be used by the electronic device is generated by performing signal processing on the audible signals.

In the above aspect of the present invention, wherein in the step (a), a reference signal which is implemented as an infrared or RF signal and generated by the ultrasonic generating device is received by a reference signal receiver mounted to the electronic device, and wherein the reference time is a time at which the reference signal receiver receives the reference signal.

Advantageous Effects

According to the present invention, a plurality of broadband microphones that can be used as general microphones provided to an electronic device are used in a case where information is input by using an ultrasonic generating device. In this case, a position of the ultrasonic generating device is measured by extracting an ultrasonic signal generated by the ultrasonic generating device from signals received by the broadband microphones, and information is input by using the position of the ultrasonic generating device and a trajectory of the moving ultrasonic generating device.

Therefore, the inconvenience of a related art in that a plurality of ultrasonic sensors prepared additionally have to be mounted to an electronic device or a frame to which the plurality of the ultrasonic sensors are mounted has to be connected whenever information is input by using ultrasonic signals, particularly, a problem in that the plurality of ultrasonic sensors have to be prepared to perform information inputting using the ultrasonic waves by a portable electronic device, can be solved.

BEST MODE FOR CARRYING OUT THE INVENTION

Exemplary embodiments of the present invention will now be described in detail with reference to the accompanying drawings.

Figure 1:
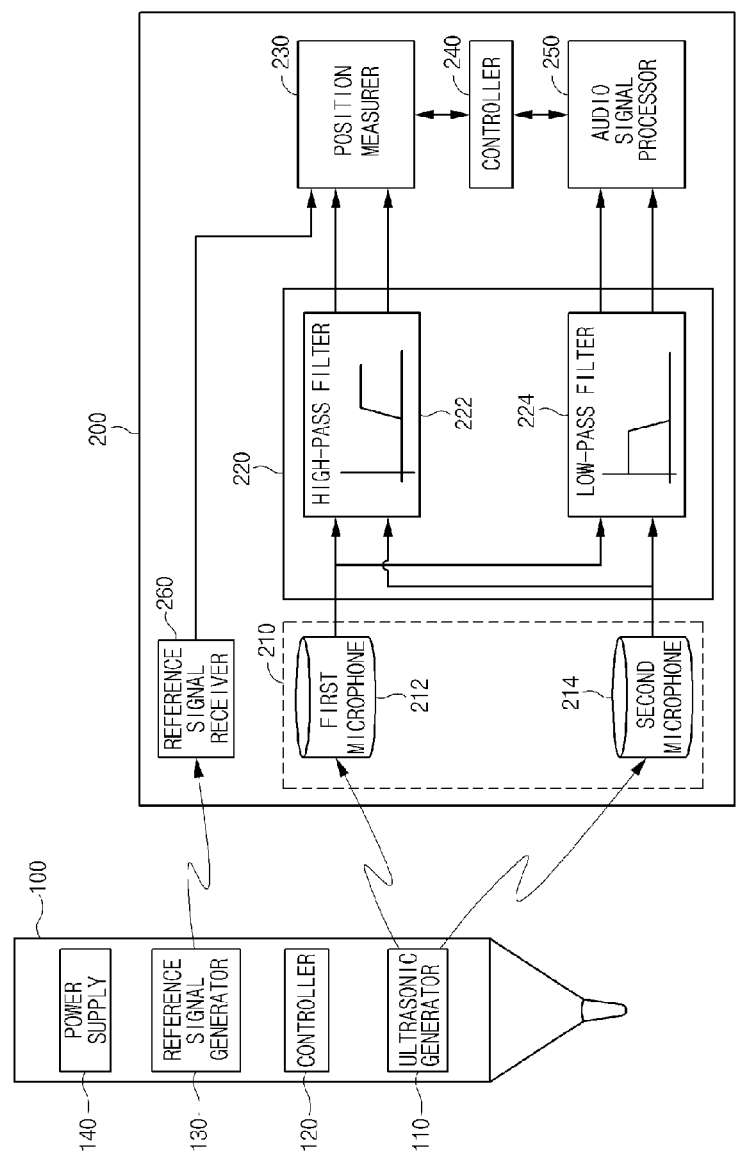
FIG. 1 is a block diagram illustrating constructions of a position measurement device and an ultrasonic generating device according to the present invention.

FIG. 1 is a block diagram illustrating constructions of a position measurement device 200 and an ultrasonic generating device 100 according to the present invention. Referring to FIG. 1, the position measurement device 200 according to the present invention receives an ultrasonic signal from the ultrasonic generator 100 and measures a position of the ultrasonic generating device 100. The ultrasonic generating device 100 includes an ultrasonic generator 110, a reference signal generator 130, a controller 120, and a power supply 140.

The controller 120 of the ultrasonic generating device 100 generates and outputs control signals for instructing to generate an ultrasonic signal and a reference signal by predetermined periods to the ultrasonic generator 110 and the reference signal generator 130.

When the ultrasonic generator 110 and the reference signal generator 130 receive the control signals from the controller 120, the ultrasonic generator 110 and the reference signal generator 130 generate and emit an ultrasonic signal and an infrared or RF signal, respectively.

The power supply 140 is implemented as a battery and supplies power to the controller 120, the ultrasonic generator 110, and the reference signal generator 130.

However, as described later, in a case where the ultrasonic generating device 100 is connected to the position measurement device 200 through a line and supplied with the control signal and power from the position measurement device 200, the ultrasonic generating device 100 is provided with only the ultrasonic generator 100, and the remaining components may be omitted.

The position measurement device 200 according to the present invention includes a plurality of microphones 210 (hereinafter, referred to as mikes), a filtering unit 220, an audio signal processor 250, a position measurer 230, a reference signal receiver 260, and a controller 240. The filtering unit 220 includes a low-pass filter 224 and a high-pass filter 222.

First, a plurality of the mikes 212 and 214 are disposed in an electronic device at a predetermined interval to receive a voice signal of a user and the ultrasonic signal. Due to the development of the information and communications technologies, most of electronic devices (for example, notebooks, personal digital assistants (PDAs), digital cameras, mobile phones, potable multimedia players (PMPs), and the like) that have been currently used, include cameras and mikes to take videos and record voices of users.

According to the present invention, the two mikes are included in the electronic device to be disposed at a predetermined interval. Therefore, when position measurement is not performed, the mikes serve as general mikes, and when the position measurement is performed, the mikes perform a function of measuring a position of the ultrasonic generating device 100 by using the ultrasonic signal generated by the ultrasonic generating device 100 in addition to the original function, that is, a function of receiving a voice of a user and processing an audio signal like the general mikes.

Here, the mikes used according to the present invention have broadband frequency characteristics to receive ultrasonic signals having frequencies above 20 KHz in addition to audible signals having frequencies of from 20 to 20,000 Hz.

In addition, in a case where a 2D position of the ultrasonic generating device 100 is to be measured, for example, in a case where messages are input by moving the ultrasonic generating device 100 in a 2D space, two mikes are included in the electronic device. However, in a case where a 3D position of the ultrasonic generating device 100 is to be measured, three mikes that are disposed at predetermined intervals are included in the electronic device. In FIG. 1, an example of mounting the two mikes 212 and 214 is illustrated, and hereinafter, a case where the two mikes 212 and 214 are mounted is exemplified.

The filtering unit 220 extracts an audio signal and an ultrasonic signal from each signal input from the mikes and outputs the audio signal and ultrasonic signal to the audio signal processor 250 and the position measurer 230, respectively.

Specifically, the filtering unit 220 includes the low-pass filter 224 and the high-pass filter 222 and the signals received from the mikes 212 and 214 are input to the low-pass filter 224 and the high-pass filter 222.

The low-pass filter 224 extracts and outputs a signal in the range of audible frequencies of from 20 to 20,000 Hz from the signals input from each mike to the audio signal processor 250, and the high-pass filter 222 extracts a signal having frequencies above the audible frequencies, and more preferably, an ultrasonic signal in a range of frequencies of from 30 KHz to 130 KHz from the signals input from each mike and outputs the extracted signal along with identification information on the mikes to the position measurer 230. According to the current embodiment, the high-pass filter is used to extract the ultrasonic signals. However, in a case where a frequency of the ultrasonic signal generated by the ultrasonic generating device 100 is determined in advance, a band-pass filter that passes only a signal having a corresponding frequency band may replace the high-pass filter 222.

The audio signal processor 250 performs audio signal processing such as converting the signal having the audible frequency input from the low-pass filter 224 into an audio signal that can be used by the electronic device and amplifying or attenuating the signal. The audio signal processing performed by the audio signal processor 250 uses a general method of processing micro-input audible frequency signals by a general electronic device, so that a detailed description thereof is omitted.

When the position measurer 230 receives the ultrasonic signal from the high-pass filter 222 and the identification information on a mike receiving the corresponding ultrasonic signal, the position measurer 230 measures a position of the ultrasonic generating device 100 that generates the ultrasonic signal by using a time difference between the ultrasonic signal received by each of the mikes 212 and 214 and the reference time.

Here, the reference time is a time at which the ultrasonic signal is generated by the ultrasonic generating device 100. In a case where the ultrasonic generating device 100 is separated from the electronic device and generates the ultrasonic signal by using internal power, the reference time is a time at which the reference signal is received by the reference signal receiver 260. In a case where the ultrasonic generating device 100 is connected to the electronic device through a line such as a universal serial bus (USB) cable to be supplied with power from the electronic device and receive the control signal for instructing to generate the ultrasonic signal from the electronic device, the reference time is a time at which the controller 240 outputs the control signal to the ultrasonic generating device 100.

The reference signal receiver 260 receives and outputs the infrared or RF signal generated by the ultrasonic generating device 100 to the position measurer 230. However, as described above, in the case where the ultrasonic generating device 100 is connected to the electronic device and receives the control signal to generate the ultrasonic signal from the controller 240, the reference signal receiver 260 may be omitted.

The controller 240 controls overall functions of the aforementioned components. Particularly, in the case where the ultrasonic generating device 100 is connected to the electronic device through the line, the controller 240 generates and outputs the control signal for instructing to generate the ultrasonic signal by predetermined periods to the ultrasonic generating device 100.

Figure 2:
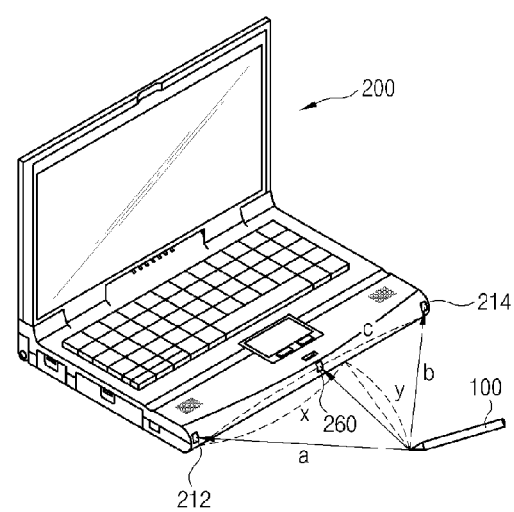
FIG. 2 is a view for explaining a method of measuring a position of the ultrasonic generating device implemented in an input pen by the position measurement device included in a notebook according to an exemplary embodiment of the present invention.

FIG. 2 is a view for explaining a method of measuring a position of the ultrasonic generating device implemented in an input pen by the position measurement device included in a notebook according to an exemplary embodiment of the present invention.

Operations of the position measurement device according to the exemplary embodiment of the present invention are described with reference to FIG. 2. The controller 120 of the ultrasonic generating device 100 (hereinafter, referred to as input pen) implemented as the input pen generates and outputs the control signal for instructing to generate the reference signal and the ultrasonic signal by predetermined periods to the reference signal generator 220 and the ultrasonic generator 110, respectively.

When the reference signal generator 220 and the ultrasonic generator 110 receive the control signals from the controller 120, the reference signal generator 220 generates the reference signal, and the ultrasonic generator 110 generates and emits the ultrasonic signal.

The position measurement device 200 is provided with the reference signal receiver 260 for receiving the reference signal and the plurality of the broadband mikes 212 and 214 for receiving the ultrasonic signal and the audible signal. Here, the broadband mikes 212 and 214 are disposed at a predetermined interval C.

The signals received from the broadband mikes 212 and 214 are input to the low-pass filter 224 and the high-pass filter 222. The low-pass filter 224 extracts and outputs a signal having the audible frequency to the audio signal processor 250, and the high-pass filter 222 extracts the ultrasonic signal and outputs the extracted ultrasonic signal along with mike identification information to the position measurer 230.

After the position measurement unit 230 receives the reference signal from the reference signal receiver 260 and receives the ultrasonic signal received to each of the mikes 212 and 214 from the high-pass filter 222, the position measurement unit 230 measures a position of the input pen 100 according to the following Equation 1. Here, (x,y) coordinates of the input pen 100 can be obtained by solving Equation 1 for x and y.

$$a^2 = x^2 + y^2$$

$$b^2 = (c-x)^2 + y^2 \quad \text{[Equation 1]}$$

Since the infrared or RF signal that is the reference signal propagates at the speed of light, in Equation 1, it can be assumed that the reference signal is generated by the input pen 100 and simultaneously received by the reference signal receiver 260. Therefore, distances a and b can be obtained by multiplying differences between the time at which the reference signal is received and the times at which the ultrasonic signal is received by the mike 212 on the left and the mike 214 on the right by the speed of sound. In addition, since a distance c is a value set in advance, by applying the values a, b, and c to Equation 1, the (x,y) coordinates can be obtained, and by using coordinate values of the moving input pen 100, notes such as messages of users or a mouse selection signal according to the position can be input.

Figure 3:
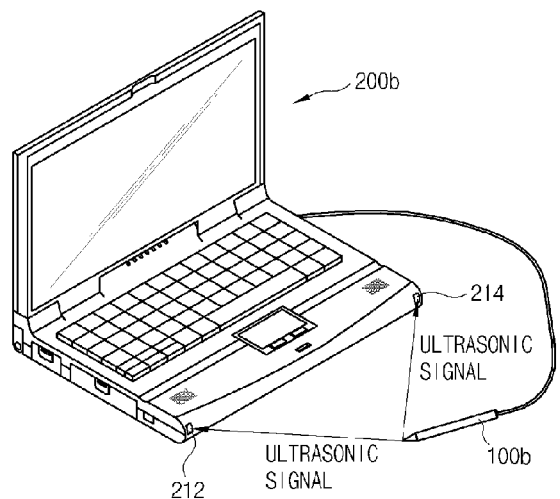
FIG. 3 is a view for explaining a method of measuring a position of the ultrasonic generating device implemented in the input pen by the position measurement device included in the notebook according to another exemplary embodiment of the present invention.

FIG. 3 is a view for explaining a method of measuring a position of the ultrasonic generating device implemented in the input pen by the position measurement device included in the notebook according to another exemplary embodiment of the present invention.

According to the embodiment illustrated in FIG. 3, as described above, an ultrasonic generating device 100b is connected to a position measurement device 200b through a line and receives the control signal and power from the position measurement device 200b. The position measurement device 200b sets the reference time to a time at which the position measurement device 200b outputs the control signal to the input pen 100b, so that the ultrasonic generating device 100b is not provided with the reference signal generator 130, and the position measurement device 200b is not provided with the reference signal receiver 260. The remaining construction in the method of measuring the position is the same as illustrated in FIG. 2, so that a detailed description thereof is omitted.

Figure 4:
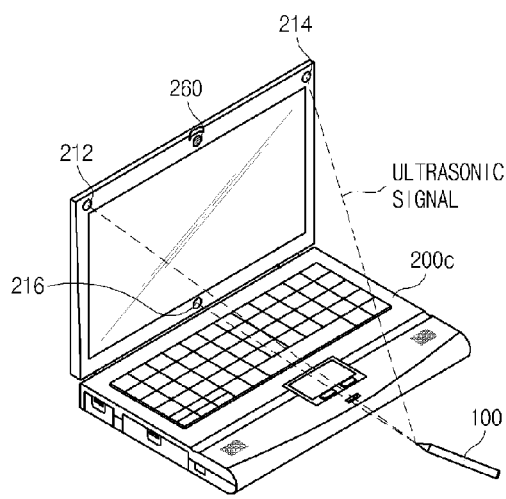
FIG. 4 is a view for explaining a position measurement device and method of measuring a 3D position of an ultrasonic generating device according to another embodiment of the present invention.

FIG. 4 is a view for explaining a position measurement device and method of measuring a 3D position of an ultrasonic generating device according to another embodiment of the present invention. According to the embodiment illustrated in FIG. 4, a position measurement device 200c is different from that according to the embodiment illustrated in FIG. 2 in that three broadband mikes 212, 214, and 216 are needed to measure a 3D position of the ultrasonic generating device 100, and the remaining operations of the position measurement device 200c are similar to those according to the embodiment illustrated in FIG. 2. Therefore, like elements performing like functions are denoted by like reference numerals.

In the embodiment illustrated in FIG. 4, when the ultrasonic generating device 100 generates and emits the reference signal and the ultrasonic signal by predetermined periods, the reference signal is received by the reference signal receiver 260 and output to the position measurer 230, and the ultrasonic signal is received by the three broadband mikes 212, 214, and 216, output to the filtering unit 220, and output to the position measurer 230 through the high-pass filter 222.

The position measurement unit 230 measures a position of the ultrasonic generating device 100 in the 3D space using the following Equations 2 to 5.

Figure 5:
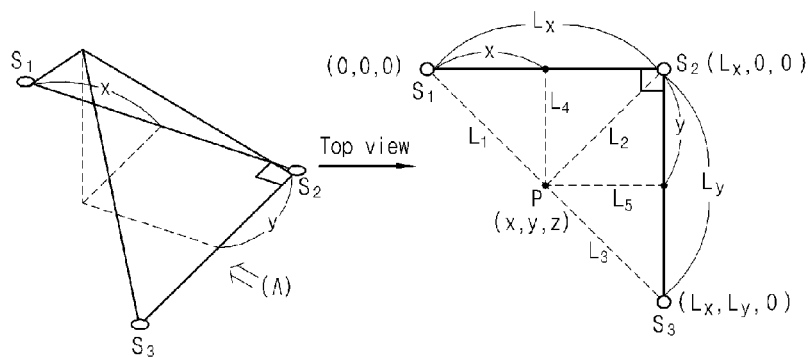
FIGS. 5 to 8 are views for explaining a method of calculating 3D coordinate values of the ultrasonic generating device in the embodiment illustrated in FIG. 4.
Figure 6:
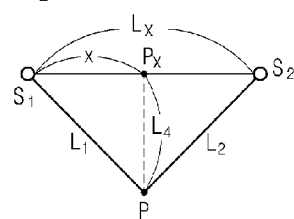

FIGS. 5 to 8 are views for explaining a method of calculating coordinate values of the ultrasonic generating device 100 by the position measurement unit 230. An example of the method of calculating the coordinate values of the ultrasonic generating device 100 is described with reference to FIGS. 5 to 8. First, as illustrated in FIG. 5, the broadband mikes mounted to the electronic device are denoted by S1, S2, and S3 and disposed at right angles on the same plane as illustrated in FIG. 5. The coordinates of the three mikes S1, S2, and S3 are set to (0,0,0), (Lx,0,0), and (Lx,Ly,0), respectively, and the coordinates of a position P of the ultrasonic generating device 100 in the 3D space are set to (x,y,z).

Here, a distance Lx between the mikes S1 and S2 and a distance Ly between the mikes S2 and S3 are determined in advance, and a distance L1 between the ultrasonic generating device 100 and the mike S1, a distance L2 between the ultrasonic generating device 100 and the mike S2, and a distance L3 between the ultrasonic generating device 100 and the mike S3 can be obtained by using time differences between the reference signal and the received ultrasonic signals as described above.

Here, in order to obtain the x-coordinate of the ultrasonic generating device 100, a triangle having three sides of L1, L2, and Lx is set, and Equation 2 is formed as follows. When Equation 2 is solved for x, the x-coordinate can be obtained as represented by the following Equation 3.

$$L_1^2 = x^2 + L_4^2$$

$$L_2^2 = (L_x - x)^2 + L_4^2 \quad \text{[Equation 2]}$$

$$x = \frac{L_x^2 + L_1^2 - L_2^2}{2L_x} \quad \text{[Equation 3]}$$

Figure 7:
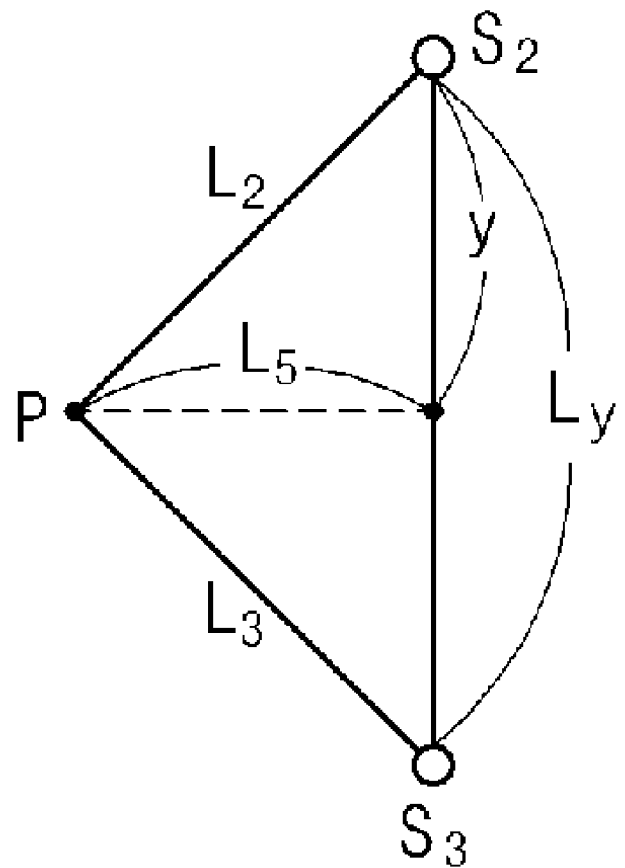

In order to obtain the y-coordinate of the ultrasonic generating device 100, a triangle having three sides of L2, L3, and Ly is set as illustrated in FIG. 7. When the triangle is solved by using the same method as in the aforementioned Equation 2, the y-coordinate can be obtained as represented by Equation 4 as follows.

$$y = \frac{L_y^2 + L_2^2 - L_3^2}{2L_y} \quad \text{[Equation 4]}$$

Figure 8:
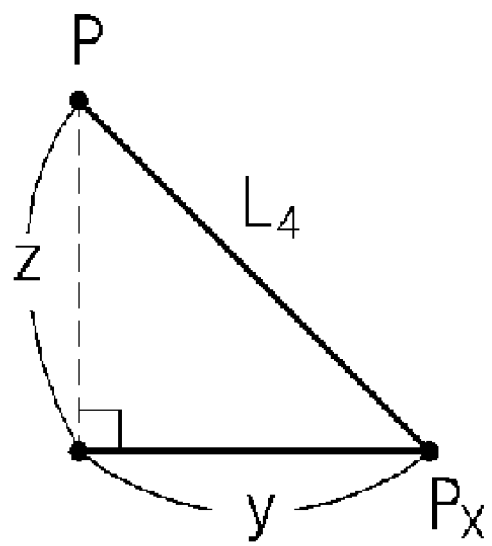

In addition, in a direction from A as illustrated in FIG. 5, as illustrated in FIG. 8, a triangle having three sides of L4, y, and z can be set, and by using the triangle, the z value can be obtained as represented by Equation 5.

$$z = \sqrt{L_1^2 - x^2 - y^2} \quad \text{[Equation 5]}$$

As described above, by using Equations 2 to 5, the coordinate values of the ultrasonic generating device 100 in the 3D space can be obtained. In addition, by using various methods in addition to the method descried with reference to Equations 2 to 5, the position coordinates of the ultrasonic generating device 100 can be measured.

In the embodiment of FIG. 4, the position measurement unit 230 can be implemented as software used in the electronic device such as desktop computers, notebooks, PDAs, mobile terminals, and the like, and the 3D coordinate values of the ultrasonic generating device 100 measured through the aforementioned operations can be used as input values input to various programs such as a video game driven by the electronic device. For example, the ultrasonic generating device 100 may be applied to a mouse or a 3D pointer moved in the 3D space and used as an input unit such the mouse or a joystick used for the video game.

The method of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A position measurement device comprising:
   a plurality of microphones which are disposed at predetermined intervals and mounted to an electronic device to receive signals having broadband frequencies;
   an ultrasonic signal filtering unit outputting signals only in a frequency range of an ultrasonic signal from the broadband frequency signals received by the plurality of the microphones;
   a position measurer measuring a position of a ultrasonic generating device by using a ultrasonic signal generated by the ultrasonic generating device and received by the plurality of the microphones; and
   an audio signal processing unit generating an audio signal to be used by the electronic device by processing the audible signal from the broadband frequency signals received by at least one of the plurality of the microphones.

2. The position measurement device of claim 1,
   wherein the position measurer measuring the position of the ultrasonic generating device by using differences between a reference time at which the ultrasonic generating device generates the ultrasonic signal and times at which the ultrasonic signal is received by the plurality of the microphones.

3. The position measurement device of claim 2, further comprising a reference signal receiver receiving a reference signal implemented as an infrared or radio frequency (RF) signal generated by the ultrasonic generating device,
   wherein the reference time is a time at which the reference signal receiver receives the reference signal.

4. A position measurement method comprising steps of:
   (a) outputting signals received by a plurality of microphones which are disposed at predetermined intervals and mounted to an electronic device to receive signals having broadband frequencies;
   (b) extracting signals only in a frequency band of an ultrasonic signal from the broadband frequency signals received by the plurality of the microphones; and
   (c) measuring a position of a ultrasonic generating device by using a ultrasonic signal generated by the ultrasonic generating device and received by the plurality of the microphones,
   wherein in the step (b), audible signals in an audible frequency band are further extracted from the broadband frequency signals received by at least one of the plurality of the microphones, and
   wherein in the step (c), an audio signal that can be used by the electronic device is generated by performing signal processing on the audible signals.

5. The position measurement method of claim 4,
   wherein in step (c), the position of the ultrasonic generating device is measured by using differences between a reference time at which the ultrasonic generating device generates the ultrasonic signal and times at which the ultrasonic signal is received by the plurality of the microphones.

6. The position measurement method of claim 5,
   wherein in the step (a), a reference signal which is implemented as an infrared or RF signal and generated by the ultrasonic generating device is received by a reference signal receiver mounted to the electronic device, and
   wherein the reference time is a time at which the reference signal receiver receives the reference signal.

7. A non-transitory computer-readable medium having embodied thereon a computer program for the position measurement method of claim 4.

8. A non-transitory computer-readable medium having embodied thereon a computer program for the position measurement method of claim 5.

9. A non-transitory computer-readable medium having embodied thereon a computer program for the position measurement method of claim 6.

* * * * *